United States Patent [19]

Mehta

[11] 4,102,657
[45] Jul. 25, 1978

[54] CENTRIFUGAL GAS SCRUBBER

[75] Inventor: Arun Kumar Mehta, Bloomfield, Conn.

[73] Assignee: Combustion Engineering, Inc., Windsor, Conn.

[21] Appl. No.: 794,894

[22] Filed: May 9, 1977

[51] Int. Cl.² ............................................. B01D 47/00
[52] U.S. Cl. ...................................... 55/222; 23/284; 23/285; 55/228; 55/257 PV; 55/269; 55/459 R; 55/460; 261/79 A
[58] Field of Search ...................... 55/92, 73, 228, 222, 55/257 R, 257 PV, 267, 269, 459 R, 460, 235–239; 261/79 A; 23/285, 260, 284; 423/242, 574 L

[56] References Cited

U.S. PATENT DOCUMENTS

| | | | |
|---|---|---|---|
| 2,090,142 | 8/1937 | Nonhebel et al. | 55/73 |
| 2,646,345 | 7/1953 | Otto | 23/260 |
| 3,233,882 | 2/1966 | Calaceto | 55/238 |
| 3,284,169 | 11/1966 | Tominago et al. | 23/284 |
| 3,687,613 | 8/1972 | Rickard | 55/73 |
| 3,789,585 | 2/1974 | Arnold et al. | 55/222 |
| 3,907,526 | 9/1975 | Saleem et al. | 55/73 |
| 3,950,151 | 4/1976 | Martin | 55/92 |

*Primary Examiner*—Bernard Nozick
*Attorney, Agent, or Firm*—Arthur L. Wade

[57] ABSTRACT

Air quality control system scrubs flue gas of $SO_2$ and particulates with a slurry of lime/limestone and water. The contact between the slurry is in a centrifugal section which is the upper part of a tank in which the chemical action is completed and from which the slurry is recirculated to the contact section. The gas to be scrubbed is inserted into a circular path within the scrubbing section into which the slurry is sprayed. The treated gas is withdrawn from the circular path in heat exchange relationship with the incoming gas.

4 Claims, 3 Drawing Figures

CENTRIFUGAL GAS SCRUBBER

BACKGROUND OF THE INVENTION

1. Field of the Invention

The present invention relates to contact of gas containing sulfur dioxide and particulate matter with finely dispersed slurry of lime/limestone. More particularly the invention relates to directing the gas to be contacted in a circular path through which a slurry of lime/limestone is sprayed while the gas in the entrance and gas in the exit of the path are maintained in a heat exchange relationship.

2. Description of the Prior Art

Regulatory agencies are limiting the emissions from oil and coil-fired cumbustion equipment. The foremost pollutants are sulfur dioxide and particulate matter. For example, a common limit on $SO_2$ emissions is 1.2 pounds $SO_2/10^6$ BTU heat input.

Various methods and systems to scrub pollutants from emissions have been used in the past, but the effectiveness of each is limited. Wet scrubbers provide the most effective means for controlling both the gaseous and particulate emissions. A number of different chemicals have been tried in wet scrubbers for enhancing the absorption of $SO_2$. The most versatile chemical has been lime/limestone because of its availability and low cost. However, the wet scrubber designs using lime/limestone presently available, suffer from various problems. Gas side pressure drop, liquid pumping power requirement, scaling and plugging within the scrubber, liquid carry-over with the scrubbed gas, and gas reheat have been some of the major costs and problems associated with the development of wet scrubber technology.

There is need for (1) increased effectiveness in the contact between the gas and the liquid so as to lower the liquid pumping power requirement, (2) low gas-side pressure drop by minimizing restrictions in gas flow, (3) minimizing the plugging and scaling potential by minimizing the scrubber internals, (4) minimizing the liquid entrainment with the scrubbed gas, and (5) providing a means for re-heating the scrubbed gas without having to use premium fuels such as natural gas and oil.

SUMMARY OF THE INVENTION

It is a principal object of the invention to place the gas to be treated into a circular path above the reaction tank and spray a liquid-treating chemical down through the path.

It is another object to bring the entrance and exit of the gas streams into direct heat exchange.

It is another object of the invention to place the gases to be treated in a circular path and withdraw the gas, as treated, from a location which establishes adequate retention time for the chemical reaction.

The present invention provides a housing with an upper section in which a centrifugal force is generated on entering gas to be treated and through which gas treating chemical is sprayed. The entrance and exit to the upper section exchange heat between the gases through a common wall, the heat transmission being enhanced by fin structure on the common wall.

The invention further provides for the treating chemical to be distributed over the circular path for the gases so that satisfactory chemical-to-gas ratio is maintained over the gas path.

The invention further provides the exit of the treated gas above the entrance of the gas to be treated to establish satisfactory residence time for counter-current contact between the gas and chemical.

Other objects, advantages and features of the invention will become apparent to one skilled in the art upon consideration of the written specifications, appended claims, and accompanying drawings.

DRAWING DESCRIPTION

DESCRIPTION OF THE PREFERRED EMBODIMENT

Figure 1:
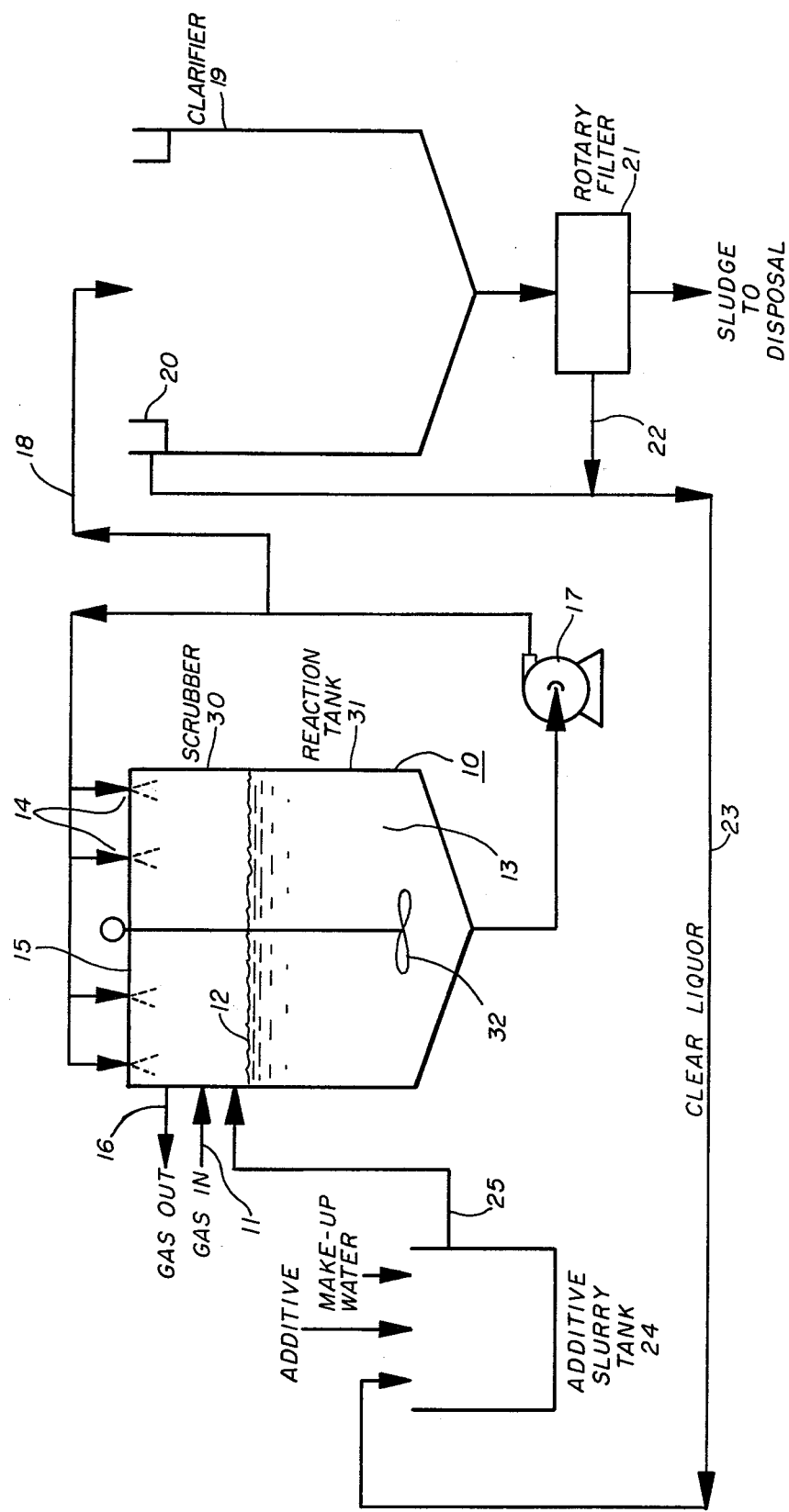
FIG. 1 is somewhat diagrammatic elevation of a flue gas scrubber system in which the invention is embodied.

FIG. 1 is dominated by scrubber-reaction tank 10. This structure is conventionally fabricated in cylindrical form, closed at the top and providing a cone bottom. The gas to be treated, or scrubbed, flows into this housing 10 through inlet 11 above the level 12 of slurry 13. The gas makes contact with slurry sprayed from nozzles 14 in cover 15 of the housing and exits through outlet 16.

The slurry, having removed the $SO_2$ and particulate matter from the gas, joins the body 13 in the lower part of the housing which acts as a reaction tank. Pump 17 circulates the slurry from body 13 to the nozzles 14. A bleed flow line 18 removes the desired amount of the slurry to clarifier 19.

In clarifier 19 the solids settle and clarified water is available as it is decanted over weir 20. A rotary filter 21 is connected to the bottom of clarifier vessel 19 to receive the predominately solids from the bottom of the clarifier. Additional water may be withdrawn from filter 21, through conduit 22, to join the clarified water from weir 20. Clarified water from both sources is supplied through conduit 23 to additive slurry tank 24. A make-up slurry is formed in tank 24 and drawn through conduit 25 into housing 10 as needed.

Figure 2:
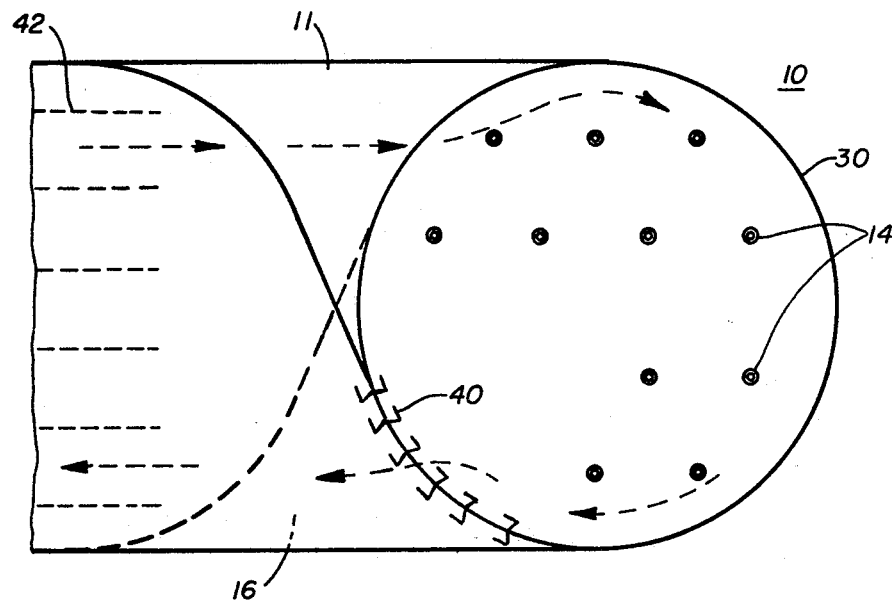
FIG. 2 is a plan view of the upper scrubbing section mounted above the reaction tank of FIG. 1.

As will be more evident in connection with FIG. 2, the heart of the system is the "tangential scrubber". In the upper section 30 of housing 10, the hot flue gas to be treated is inserted tangentially at high velocity into this upper section 30. The spray nozzles 14, mounted through the cover 15, spray the scrubbing slurry down over the circular path of the gases. The gas, while making circular sweep/sweeps, contacts the spray droplets and is scrubbed of its sulfur dioxide and particulate matter. The scrubbed gas leaves through outlet conduit 16 which is located to be in heat exchange relationship to conduit 11. The treated gas is reheated within the outlet conduit 16 by this indirect heat transfer.

The spent scrubbing slurry drops from section 30 into the lower reaction tank section 31. Additive slurry is flowed from tank 24 into the reaction tank section 31 which is continuously stirred by propeller 32. The slurry supply to nozzles 14 is circulated from section 31 by pump 17. A bleed is directed to clarifier 19 through conduit 18. An underflow of the clear liquor goes to rotary filter 21 from which some form of disposal is made.

Figure 3:
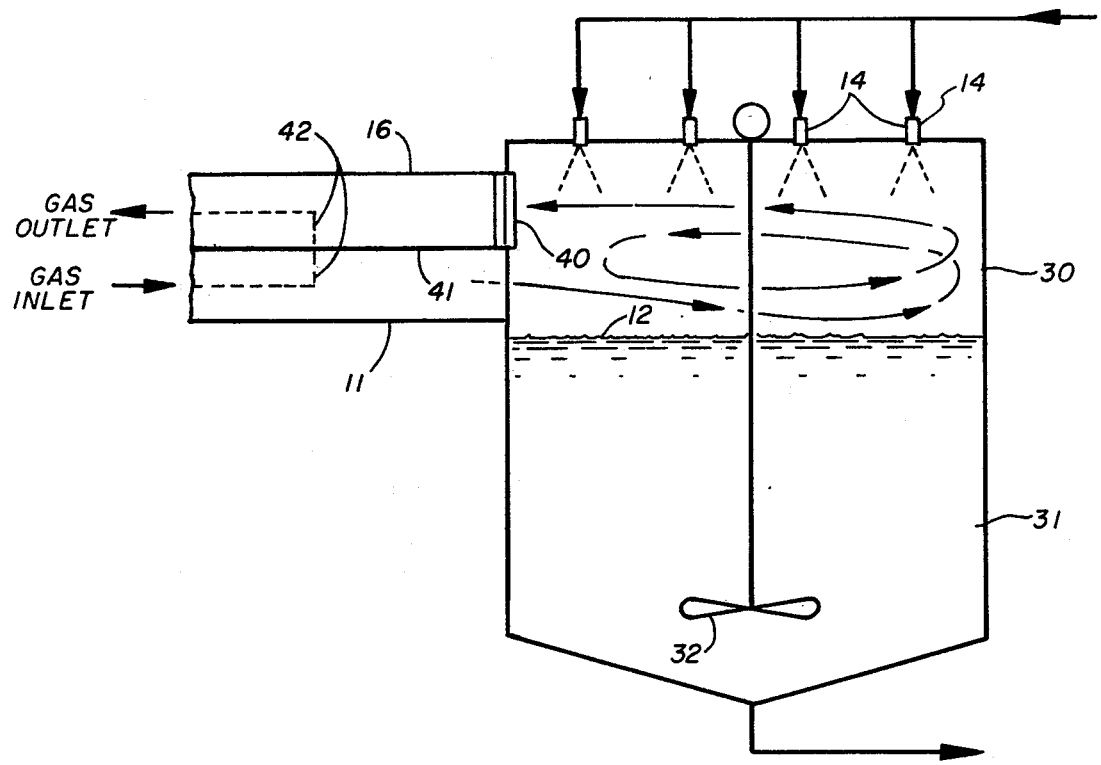
FIG. 3 is an elevation of FIG. 2.

FIG. 2 and FIG. 3 are arranged to disclose a particular relation between inlet gas conduit 11 and outlet gas conduit 16 which promotes the heat transfer between the gas streams flowing in the conduits. Other arrangements are possible which fall within the concepts of the invention. Economics of fabrication and residence time required for the gas within the scrubber 30 are factors which dictate specific arrangements for the conduits. However, the arrangement disclosed in FIGS. 2 and 3 is the preferred embodiment which falls well within the scope of the concepts of the invention.

The first functional requirement of all arrangements under the inventive concepts is to swirl the gas within the scrubber housing 30. Therefore, inlet gas conduit 11 connects to housing 30, to direct the gas to be treated tangentially into the circular housing. The swirling action separates the slurry droplets after they have been sprayed down into the gas path. This separation action reduces the load of gas-liquid separation which would otherwise fall entirely as a load on downstream demister structure in the gas flow path.

The gas forced into its circular path by the circular inner wall of section 30 is directed into an upward spiral. Therefore, a counter-current contact between the upwardly spiralling gas and downwardly sprayed slurry is provided. The number of rotations provided for the upward gas spiral is established by the number of theoretical contact stages required for the scrubbing, or treatment of the gas. In other terminology, a residence time is provided for the slurry-gas contact established by the length of the spiral path provided for the gas in housing 30 between the gas inlet conduit 11 and gas outlet conduit 16.

The upward spiral gas path is established by placing the inlet gas conduit 11 below the outlet gas conduit 16. The vertical distance between the inlet and outlet establishes the length of the spiral gas path between them. FIGS. 2 and 3 disclose the conduits directly over each other, but variations are possible under the inventive concept. The end result of all arrangements is to swirl the gas upward, within housing 30, beneath the spray nozzles 14.

Spray nozzles 14 are not evenly spaced horizontally as they are mounted down through housing cover 15. As the gas to be treated is concentrated toward the wall of the section 30, it is desirable to increase the concentration of the sprayed slurry toward the outer portion of the circular-spiral path. Therefore, as disclosed in FIG. 2, the nozzles 14 are grouped in greater numbers toward the outer portion of the spiral path.

The outlet gas conduit 16, above inlet gas conduit 11, may be connected to section 30 in various arrangements. The actual exit opening need not face in the direction which will provide a smooth flow of gases from their path within the housing 30. The exit may well face in a direction which will disrupt the even flow of the gas path at its outlet. These disruptive forces could be readily directed to provide further separation of the spent slurry from the treated gas.

A form of demister structure 40 is disclosed as mounted at the exit opening of conduit 16 from housing 30. This demister can take various forms. Essentially, it is a structure upon which the slurry-laden gas will impact as it enters conduit 16. The slurry, entrained by the gas, is expected to contact the surface of the demister, collect and flow down into the slurry body 13 in section 31.

The treated gas flows from section 30, through demister 40 and into outlet conduit 16. This treated gas contains only water vapor from the slurry to the maximum extent of saturation. It is to be reheated in outlet conduit 16.

As disclosed, the conduits 11 and 16 are arranged with a common wall 41. For simplicity, the wall 41 is disclosed as formed of metal which is capable of a high rate of heat transfer. This wall functions, fundamentally, as a means of indirect heat transfer from the gas flowing in conduit 11 to the gas flowing in conduit 16.

Under the concepts of the invention, the parallel path of conduits 11 and 16 are of the length to provide the residence time required for the treated gas to be heated to the temperature which will provide adequate desaturation. The area of the common wall 41 is provided to transfer the heat necessary to give the required temperature. Structurally the heat transfer function can be complemented by the addition of heat-conducting fins 42 on the wall. These fins 42 will extend, or enlarge, the surface of wall 41 as required to attain the heat rransfer rate between the parallel gas flows in conduits 11 and 16.

CONCLUSION

A review of the advantages this embodiment has over the prior art can be set out in order.

1. The capital costs will be lowered. The scrubber section 30 is merely an upward extension of the reaction tank 31, adding only a fraction to the total height.

2. The total gas pressure drop through the conduits and scrubber section 30 is low. There are no major restrictions in the flow path of the gas.

3. The liquid pumping horsepower is low. The slurry does not have to be pumped to the relatively great heights of the prior art vertical, multi-stage scrubbers.

4. Liquid carry-over is small. The swirling action imparted to the gas in section 30 provides effective gas-liquid separation.

5. Scaling and plugging is reduced. The internal structures are minimized. All spray nozzles 14 are outside the section 30. The walls of the section 30 are continually washed and drained by the spray action of the nozzles.

6. The cost of prime fuels is saved. The reheating of the treated gas is a conservation of energy which would otherwise come from natural gas and low sulfur oil for this purpose.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. Contact structure within which gas to be treated is brought into contact with liquid which has the potential to remove contaminates from gas it contacts, including,
    a source of gas containing contaminates to be removed,
    a cylindrical housing extended vertically,
    an inlet duct substantially rectangular in cross-section and connected through the side wall of the housing and to the source of gas and arranged and directed to flow the gas on the internal wall of the housing to initiate a circular flow path for the gas, an outlet duct substantially rectangular in cross-section and connected through the side wall of the housing at a vertical elevation higher than the connection of the inlet duct and having a common wall with the inlet duct and flowing the gas from the upwardly spiralling flow path and into heat exchange relationship with the inlet gas through the common wall, a volume within the housing and below the spiral gas path for liquid with which to remove contaminates from gas, a body of liquid within the lower housing which has the potential to remove contaminates from gas, nozzles positioned above the gas path within the housing and arranged and directed to discharge liquid into the gas path, and conduit and pump means connecting the nozzles and body of liquid to supply the nozzles with liquid from the body.

2. The contact structure of claim 1 in which,
the common wall between the inlet duct and outlet duct has fin structure mounted on it to extend the heat exchange surface in contact with the gas in the ducts.

3. The contact structure of claim 1 in which,
demister structure is mounted in the connection between the outlet duct and housing wall to contact the gas leaving the housing and remove entrained liquid from the gas.

4. The contact structure of claim 1 in which the nozzles are horizontally grouped above the gas path and discharge more liquid into the gas path near the wall of the housing than the center of the housing.

* * * * *